United States Patent [19]

Shiokawa et al.

[11] Patent Number: 5,408,370
[45] Date of Patent: Apr. 18, 1995

[54] COMPACT CASSETTE LOADING DEVICE WITH MOVABLE TAPE GUIDE MEMBER

[75] Inventors: Hiroshi Shiokawa, Toyonaka; Toshikazu Ura, Minoo; Akio Konishi, Hirakata; Hideaki Yoshio, Moriguchi, all of Japan

[73] Assignee: Matsushita Electric Industrial Co., Ltd., Osaka, Japan

[21] Appl. No.: 865,861

[22] Filed: Apr. 9, 1992

[30] Foreign Application Priority Data

| Apr. 16, 1991 | [JP] | Japan | 3-083873 |
| Apr. 16, 1991 | [JP] | Japan | 3-083874 |
| Apr. 16, 1991 | [JP] | Japan | 3-083876 |
| Apr. 17, 1991 | [JP] | Japan | 3-085070 |

[51] Int. Cl.⁶ .................... G11B 5/027; G11B 5/008
[52] U.S. Cl. ......................... 360/85; 360/96.6
[58] Field of Search ............... 360/96.5, 96.6, 130.22, 360/130.21, 130.3, 130.31, 137, 85, 96.5, 96.6, 92

[56] References Cited

U.S. PATENT DOCUMENTS

| 3,900,170 | 8/1975 | Serizawa | 360/96.6 |
| 4,564,875 | 1/1986 | Ihara | 360/96.6 |
| 4,782,407 | 11/1988 | Hwang | 360/85 |
| 4,811,138 | 3/1989 | Park | 360/96.6 |
| 4,907,889 | 3/1990 | Simone | 360/92 |
| 4,954,916 | 9/1990 | Tobimatsu | 360/96.5 |
| 5,001,582 | 3/1991 | Numasaki | 360/92 |
| 5,103,357 | 4/1992 | Nakanishi | 360/96.5 |

FOREIGN PATENT DOCUMENTS

| 0196623A3 | 10/1986 | European Pat. Off. |  |
| 0308172A2 | 3/1989 | European Pat. Off. |  |
| 0431912 | 6/1991 | European Pat. Off. | 360/96.6 |
| 63-78365 | 4/1988 | Japan | 360/96.6 |
| 2143937 | 6/1990 | Japan | 360/96.6 |
| 2301058 | 12/1990 | Japan | 360/96.5 |
| 2093258 | 8/1982 | United Kingdom |  |
| 2211980 | 7/1989 | United Kingdom |  |

OTHER PUBLICATIONS

Patent Abstracts of Japan, vol. 14, No. 153 (P-1026) 23 Mar. 1990 & JP-A-20 012 644 (Toshiba Corp.) 17 Jan. 1990.
Patent Abstracts of Japan, vol. 13, No. 125 (P-847) (3473) 28 Mar. 1989 & JP-A-63 293 745 (Pioneer Electronic Corp.) 30 Nov. 1988.
Patent Abstracts of Japan, vol. 14, No. 124 (P-1018) (4067) 8 Mar. 1990 & JP-A-01 319 160 (Matsushita Electric Ind. Co. Ltd.) 25 Dec. 1989.
Patent Abstracts of Japan, vol. 14, No. 128 (P-1019) (4071) 9 Mar. 1990 & JP-A-01 320 665 (Matsushita Electric Ind. Co. Ltd.) 26 Dec. 1989.
Patent Abstracts of Japan, vol. 9, No. 83 (P-348) (1806) 12 Apr. 1985 & JP-A-59 213 054 (Nippon Victor K.K.) 1 Dec. 1984.

*Primary Examiner*—Stuart S. Levy
*Assistant Examiner*—David D. Davis
*Attorney, Agent, or Firm*—Stevens, Davis, Miller & Mosher

[57] ABSTRACT

A cassette loading device is compact, lightweight, thin and used in a video tape player or the like. An opening lever is pivotally mounted on a stand, and is engaged in a cam groove with a top plate. With this arrangement, the opening lever is accommodated within a longitudinal dimension of a cassette, and therefore the loading device in the direction of the longitudinal dimension of the cassette can be greatly reduced. The cassette is moved through the pivotal movement of the top plate and arms, and with this arrangement operating switches and so on can be easily mounted on a plane of projection of the top plate. Therefore, the positional stability of the cassette loading device can be achieved, and the number of component parts can be reduced, thereby achieving a compact, lightweight construction of the cassette loading device.

7 Claims, 18 Drawing Sheets

COMPACT CASSETTE LOADING DEVICE WITH MOVABLE TAPE GUIDE MEMBER

BACKGROUND OF THE INVENTION

1. Field of the Invention

This invention relates to a cassette loading device for use, for example, in a video tape player for recording and reproducing video signals and the like using a magnetic tape.

2. Related Art

Recently, video tape players have been desired to be compact and lightweight, and therefore a cassette loading device which is one constituent element of the video tape player has also been desired to be compact and lightweight.

A conventional cassette loading device will now be described.

FIG. 16 is a perspective view of the conventional cassette loading device in a cassette loading/unloading position, FIG. 17 is a side-elevational view showing a tape guide portion in a cassette-down position of the conventional cassette loading device, FIG. 18 is an enlarged top plan view showing the positional relation between an opener of the cassette loading device and a cassette, and FIGS. 19 and 20 are a side-elevational view and a cross-sectional view of the cassette loading device in the cassette-down position, respectively. In FIG. 16, the cassette 101 has a lid 101a, and a cassette holder 102 releasably holds the cassette 101. Each of a first arm 103 and a second arm 104 is supported for pivotal movement at one end thereof and for sliding movement at the other end thereof, and the two arms 103 and 104 are pivotally engaged with each other generally at their central portions. A stand 105 has the axis of pivotal movement of the first arm 103, and a sliding groove for the second arm 104. A spring 106 is engaged with the first and second arms 103 and 104, and urges the cassette holder 102 from the cassette-down position (FIGS. 17 and 19) toward the cassette attachment/detachment position (FIG. 16). Biasing springs 107 are fixedly secured at their one ends to the cassette holder 102. An opener 108 is pivotally connected at one end 108a to the cassette holder 102, and is engaged with a slide pin 103a of the arm 103. A guide 109 serves to prevent a magnetic tape 100 from running on a cylinder 111 when the magnetic tape 100 is slack, thereby preventing the magnetic tape 100 from being damaged. An outer shell 110 pivotally supports the guide 109.

The operation of the conventional cassette loading device of the above construction will now be described. First, in the condition shown in FIG. 16, when the cassette 101 is inserted into the cassette holder 102 in a direction of arrow A, the distal end of the opener 108 is disposed between the cassette 101 and the lid 101a as shown in FIG. 18. When the cassette holder 102 is manually moved toward the cassette-down position (FIGS. 17 and 19), the slide pin 103a of the arm 103 moves along a slide groove in the cassette holder 102, and the engagement portion of the opener 108 is pivotally moved about its end 108a in a direction of arrow B in response to the movement of the slide pin 103a, thereby opening the lid 101a. Upon further movement of the cassette holder 102, if the magnetic tape 100 is slackened, the magnetic tape 100 moves toward the cassette-down position (FIG. 17) along the guide 109 without interfering with the cylinder 111. In the cassette-down position shown in FIG. 20, the cassette holder 102 is locked at a predetermined position of the device body by a lock mechanism (not shown), and the cassette 101 is engaged with positioning pins 112 on the device body, and is urged by the biasing springs 107 in the direction of arrow B, so that the cassette 101 is loaded and fixed at a predetermined position. At this time, the guide 109 is engaged with the cassette lid 101a, and is pivotally moved about a pivot axis 109a as shown in FIG. 17 to be disposed between the cassette lid 101a and the cylinder 111. Then, when the lock mechanism is released, the first and second arms 103 and 104 are pivotally moved by the biasing force of the spring 106, so that the cassette holder 102 is returned to the position shown in FIG. 16 where the cassette 101 can be attached to and detached from the cassette holder 102. At this time, the guide 109 is released from the bias of the cassette lid 101a, and is returned to the initial position, and then the lid 101a is closed.

As regards a first problem of the above conventional construction, since the guide 109 is mounted on the outer shell 110, it is difficult to precisely position the guide 109 relative to the cylinder 111, and a gap between the guide 109 and the cylinder 111 must be secured, which results in a problem that the device can not be of a compact construction. And besides, the cassette lid 101a must be opened at an early timing, and a sufficient design margin of the opener 108 can not be obtained.

As regards to a second problem, the opener 108 must be provided on the outer side of the cassette holder 102, and therefore the number of the component parts arranged in the longitudinal direction of the cassette is increased, which results in a problem that the device can not be of a compact construction. Moreover, there has been encountered a problem that when the cassette holder 102 is moved down during the insertion of the cassette 101, the opener 108 fails to be engaged with the lid 101a. Further, if it is intended to solve this problem, a mechanism separate from the opener 108 must be provided, which results in a problem that the number of the component parts is increased, so that the device becomes heavy.

As regards a third problem, for example, in the case of a video tape player, the projected area ratio of the cassette loading device to the whole of the video tape player is made large when the overall construction is to become compact, and in this case it is desired to provide operating switches, including a recording switch, a playback switch and a stop switch, on the top surface of the cassette holder 102; however, since the cassette holder 102 is moved generally linearly, it is difficult to mount the wiring of such switches.

As regards to a fourth problem, when the cassette 101 is loaded, the reaction force of the biasing springs 107 acts on the cassette holder 102. When the cassette 101 is unloaded, the reaction force of the biasing springs 107 does not act on the cassette holder 102. Therefore, there has been encountered a problem that the position of the cassette holder 102 varies depending on whether or not the cassette 101 exists. Moreover, the pair of biasing springs 107 are needed for fixing the cassette 101 to the device body in the cassette-down position shown in FIG. 17, and besides a shaft 113 for aligning the right and left movements of the cassette holder 102 with each other is required, which results in a problem that the number of the component parts is increased. This is disadvantageous in making the device compact and lightweight. Further, if it is intended to overcome the above problem, a mechanism separate from the cassette holder is needed, and for example, in the case of the video tape player (final product), the number of the component parts is increased, and the video tape players becomes larger and heavier.

SUMMARY OF THE INVENTION

With the above first problem of the prior art in view, it is a first object of this invention to provide a cassette loading device which can positively guide a magnetic tap with a simple construction, and can be of a compact design.

With the above second problem of the prior art in view, it is a second object of the invention to provide a cassette loading device which can positively open a cassette lid with a simple construction.

With the above third problem of the prior art in view, it is a third object of the invention to provide a cassette loading device in which operating switches and so on can be provided at a plane of projection of the cassette loading device with a simple construction.

With the above fourth problem of the prior art in view, it is a fourth object of the invention to provide a cassette loading device which can provide a stable positional relation with a simple construction regardless of whether a cassette is loaded or unloaded.

The above first object has been achieved by a cassette loading device comprising: a cassette holder for receiving a cassette having a magnetic tape contained therein; guide means for guiding the magnetic tape during the movement of the cassette holder from a first position where the cassette can be loaded on and unloaded from the cassette holder to a second position where signals are recorded on or reproduced from the magnetic tape; and moving means for moving the guide means in response to the movement of the cassette holder, the moving means being capable of moving the guide means away from the cassette when the cassette holder is disposed in the second position.

With this construction, in response to the movement of the cassette, the tape guide can be moved in such a manner that the tape guide is so positioned as to prevent the slackened magnetic tape from running on a cylinder until the lower edge of the magnetic tape passes past the upper end of the cylinder, thereby preventing damage to the magnetic tape, and also the tape guide can be moved in the gap between the cassette lid and the cylinder. Therefore, the gap between the cylinder and the cassette lid can be reduced, thereby achieving the compact and thin construction of the cassette loading device.

The above second object has been achieved by a cassette loading device comprising: a cassette holder for receiving a cassette having a magnetic tape contained therein, the cassette having a lid; a pivotal member pivotally mounted on a body of the device; connecting means interconnecting the pivotal member and the cassette holder so that the pivotal movement of the pivotal member can cause the cassette holder to move from a first position where the cassette can be loaded on and unloaded from the cassette holder to a second position where signals are recorded on or reproduced from the magnetic tape; and a first member pivotally mounted on the body of the device and adapted to be engaged with the pivotal member, the first member being engaged with the lid of the cassette to open the lid when the pivotal member is pivotally moved in such a direction as to move the cassette holder from the first position toward the second position.

In this construction, the member for opening the cassette lid is pivotally supported on the base, and this member is pivotally moved in response to the pivotal movement of the pivotal member. With this arrangement, the mechanism for opening the cassette lid can be accommodated within the longitudinal dimension of the cassette, and the operation can be positively effected with the simple construction, and there can be provided the cassette loading device of a compact design.

The above third object has been achieved by a cassette loading device comprising: a cassette holder for receiving a cassette having a magnetic tape contained therein; a first member pivotally mounted on a body of the device; and a second member pivotally mounted at one end thereof on the first member, the second member being engaged at the other end thereof in a cam groove formed in the body of the device; the cassette holder being pivotally connected to the second member, and being engaged in a cam groove formed in the first member so that the pivotal movement of the first member can cause the cassette holder to move from a first position where the cassette can be loaded on and unloaded from the cassette holder to a second position where signals are recorded on or reproduced from the magnetic tape.

With this construction, the cassette holder (and hence the cassette) can be moved between the first position and the second position by the pivotal movement of the first member, and operating switches and so on can be mounted on the plane of projection of the first member. And besides, the number of component parts can be reduced, and therefore there can be provided the cassette loading device of a compact, lightweight construction.

The above fourth object has been achieved by a cassette loading device comprising: a cassette holder for receiving a cassette having a magnetic tape contained therein; a first member pivotally mounted on a body of the device; a second member pivotally mounted at one end thereof on the first member, the second member being engaged at the other end thereof in a cam groove formed in the body of the device; and a resilient member; the cassette holder being pivotally connected to the second member, and being engaged in a cam groove formed in the first member, the resilient member being engaged with the first member and the second member so as to pivotally move the first member by a biasing force of the resilient member to thereby move the cassette holder from a first position where the cassette can be loaded on and unloaded from the cassette holder to a second position where signals are recorded on or reproduced from the magnetic tape, and the resilient member urging the cassette holder against the body of the device when the first member is retained on the body of the device against the biasing force of the resilient member.

With this construction, the biasing force of the resilient member for moving the cassette holder (and hence the cassette) between the first position and the second position acts, in the first position, on the cassette holder via the second member so as to urge the cassette against the device body when the first member is fixed at the predetermined position. Therefore, only with the use of this resilient member, the up-down movement of the cassette and the bias of the cassette against the device body can be done, and the positional relation of the cassette loading device is not changed, and the stable positional relation can be obtained. Further, the number of component parts can be reduced, and therefore there can be provided the cassette loading device of a compact and lightweight construction.

DESCRIPTION OF THE PREFERRED EMBODIMENTS

Figure 1A:
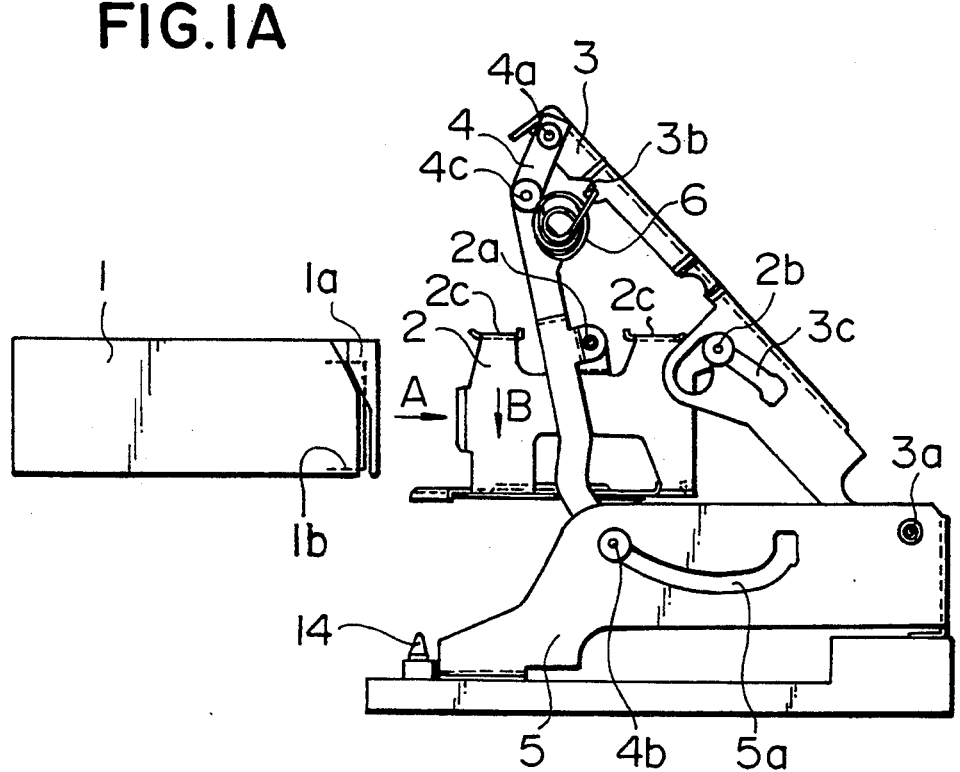
FIG. 1A is a side-elevational view of a first embodiment of a cassette loading device of the present invention in a cassette loading/unloading position.
Figure 1B:
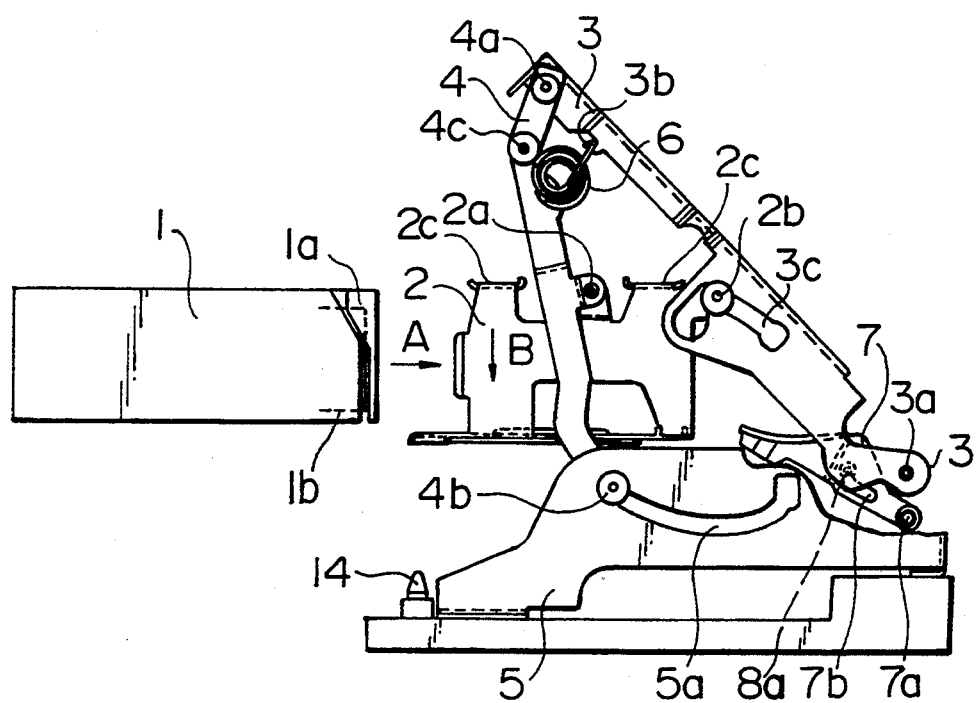
FIG. 1B is a fragmentary, side-elevational view of the device in the cassette loading/unloading position
Figure 2A:
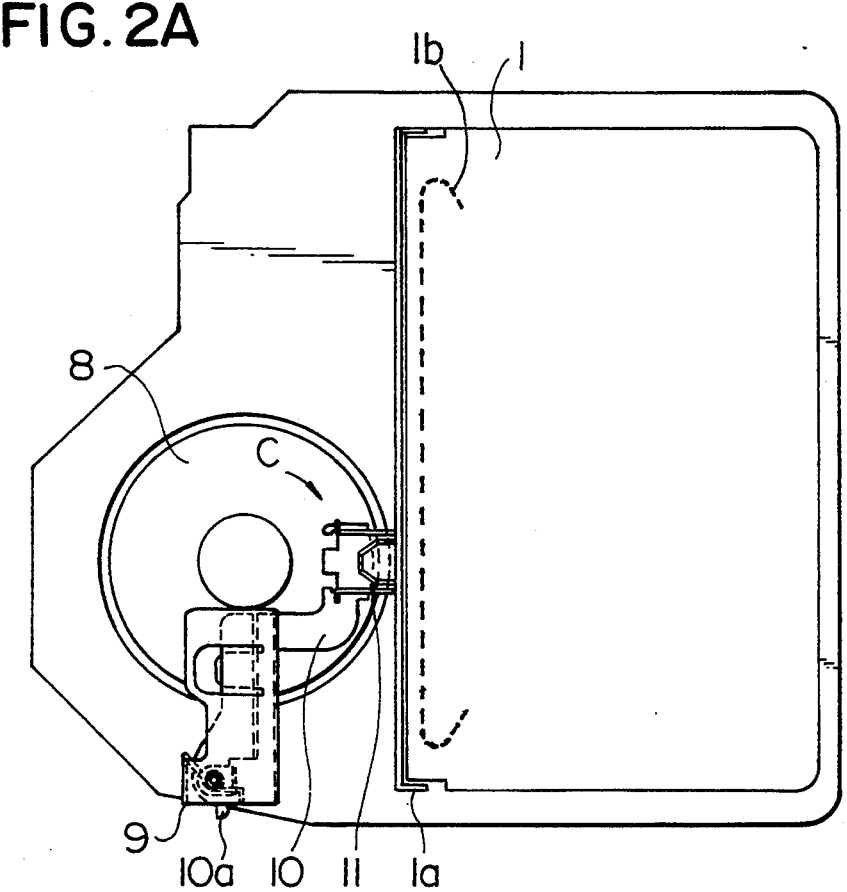
FIG. 2A is a plan view showing a tape guide portion of the device.
Figure 2B:
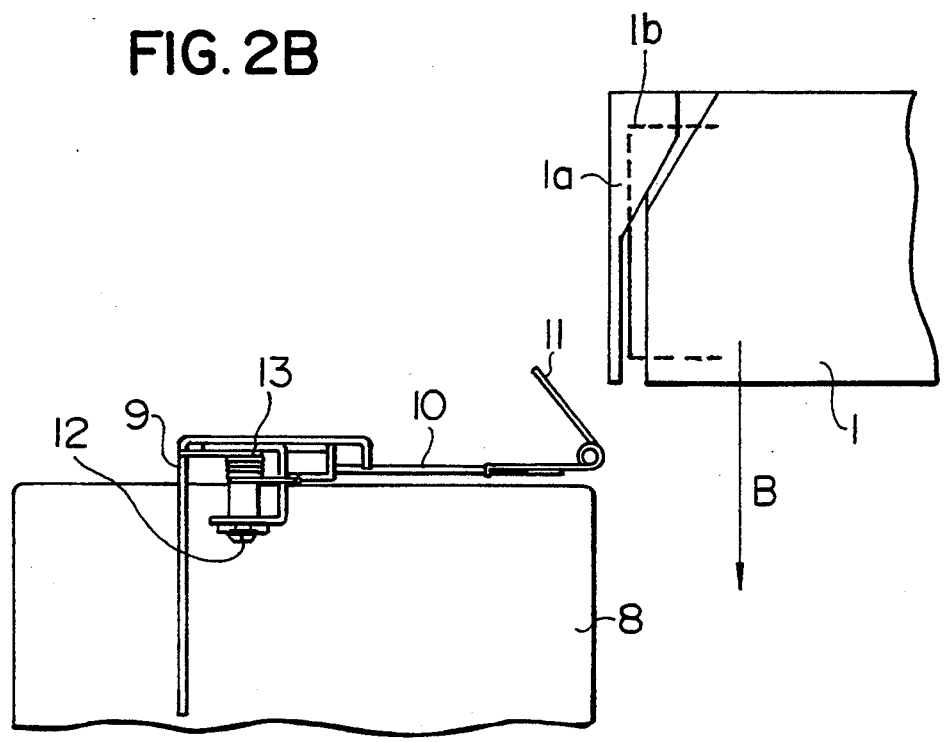
FIG. 2B is a side-elevational view showing the tape guide portion.

One preferred embodiment of the present invention will now be described with reference to the drawings.

In FIGS. 1A, 1B, 2A and 2B, the reference numeral 1 denotes a cassette; la a lid of the cassette 1; 1b a magnetic tape; 2 a pair of right and left cassette holders; 3 a top plate; 4 arms; 5 stands; 6 up-springs, and 7 an opening lever. Each cassette holder 2 is pivotally supported at its support portion 2a on the arm 4, and is slidably engaged at its support portion 2b in a cam groove 3c of the top plate 3. The top plate 3 is pivotally supported at its support portions 3a on the stands 5. The arm 4 is pivotally supported at its support portion 4a on the top plate 3, and is slidably engaged at its support portion 4b in a slide groove 5a of the stand 5. The up-spring 6 is engaged with an engagement portion 3a of the top plate 3, and is pivotally engaged with a support portion 4c of the arm 4. The opening lever 7 is pivotally supported at its support portion 7a on the stand 5, and a pin 8a formed on the top plate 3 is slidably engaged in a cam groove 7b of the opening lever 7. The reference numeral 8 denotes a cylinder, 9 a first plate fixedly secured to the stand 5 by screws, 10 a second plate pivotally supported by a pin 12 on the first plate 9, 11 a tape guide fixedly mounted on the second plate 10, and 13 a spring urging the second plate 10 in a direction of arrow C.

Figure 3A:
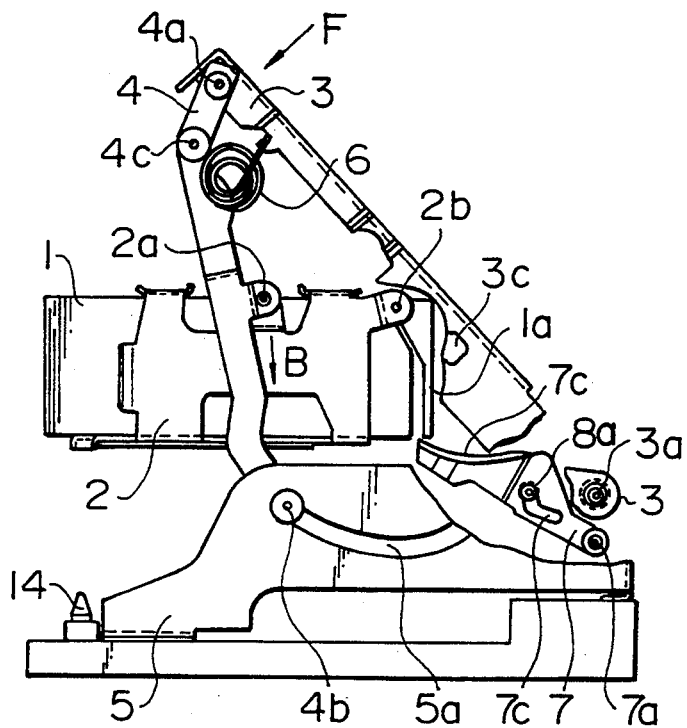
FIG. 3A is a fragmentary, side-elevational view of e device in the cassette loading/unloading position.
Figure 3B:
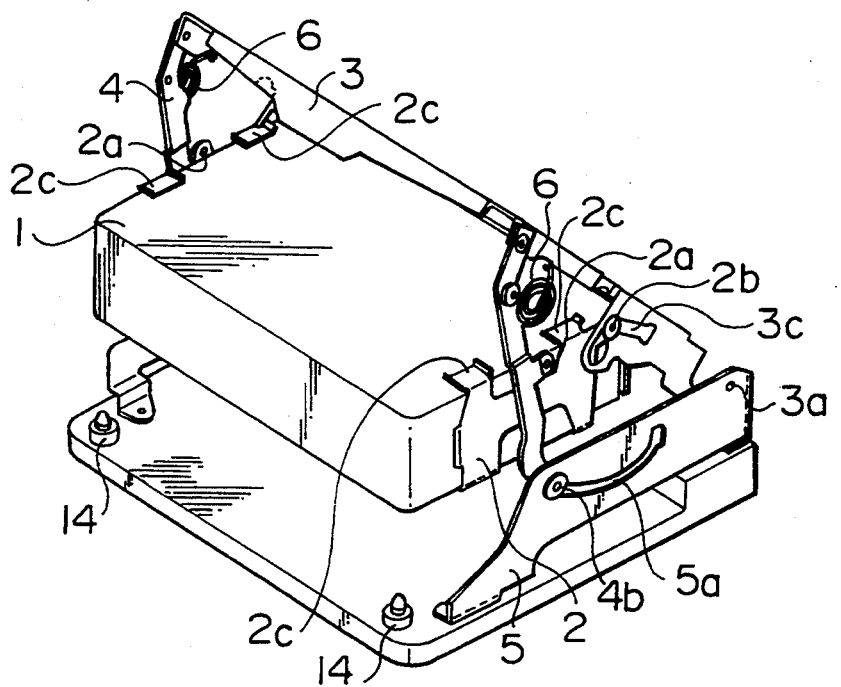
FIG. 3B is a perspective view of the device in the cassette loading/unloading position.
Figure 3C:
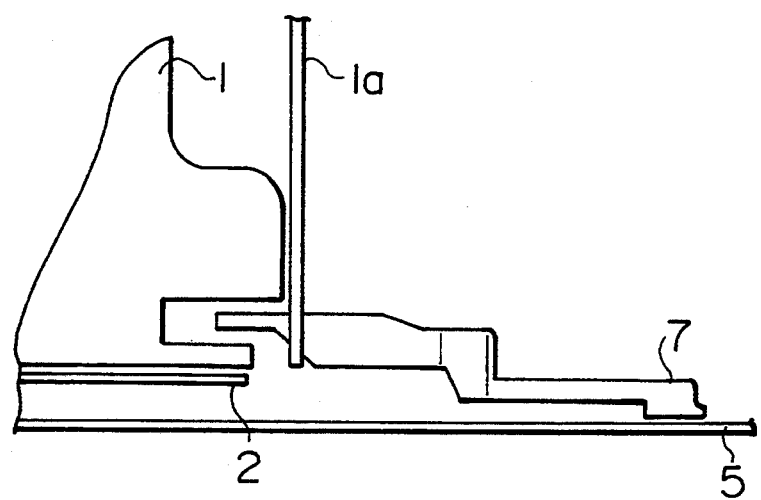
FIG. 3C is an enlarged cross-sectional view of an essential portion of the device.
Figure 4A:
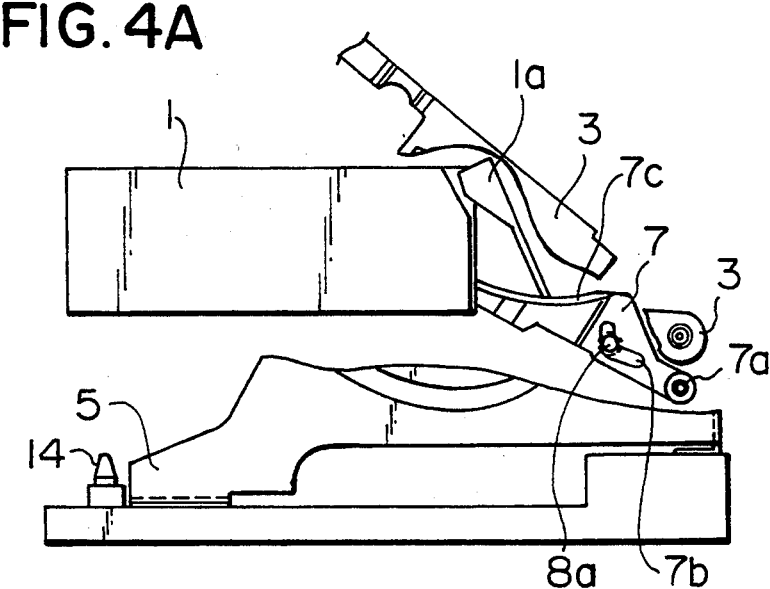
FIGS. 4A to 4C are fragmentary, side-elevational views showing the operation of an opening lever portion of the device.
Figure 4B:
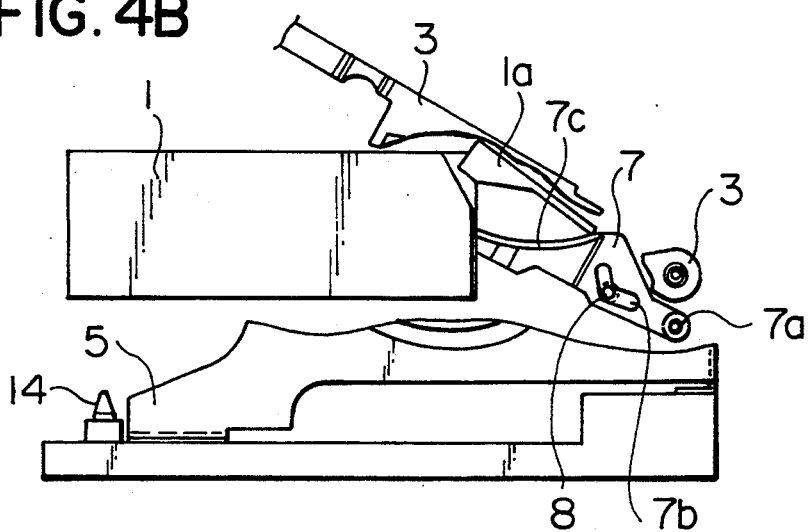
Figure 4C:
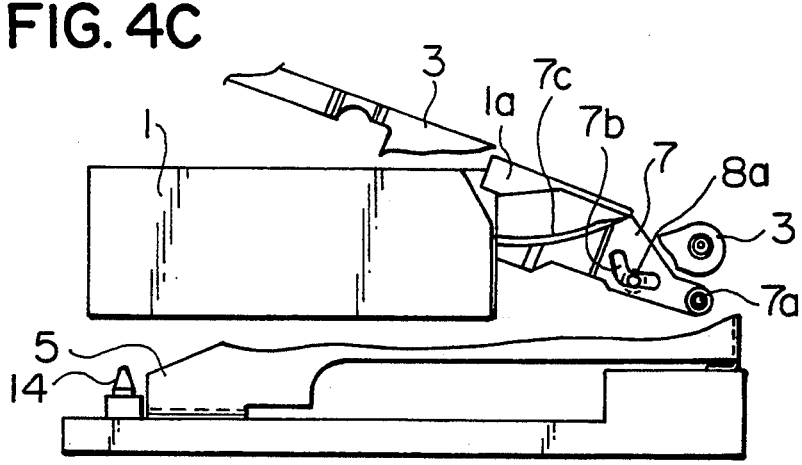
Figure 5A:
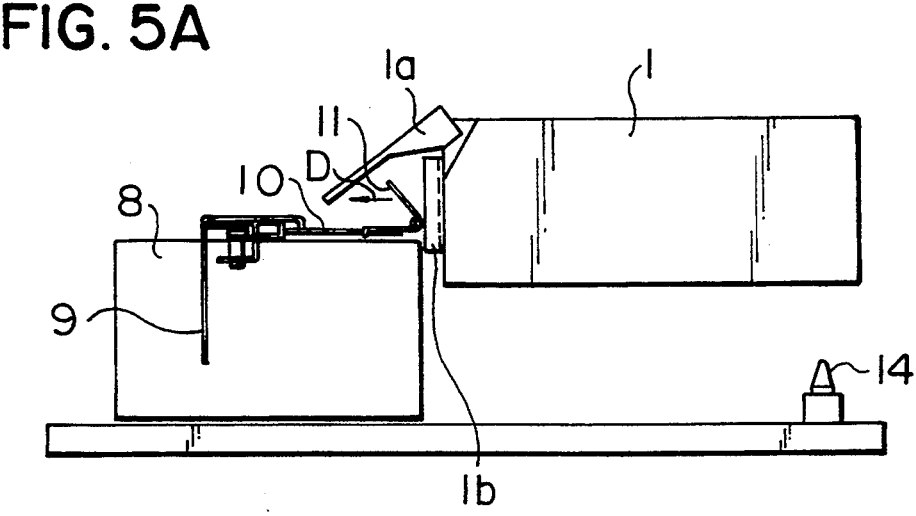
FIGS. 5A and 5B are side-elevational views showing the operation of the tape guide portion of the device.
Figure 5B:
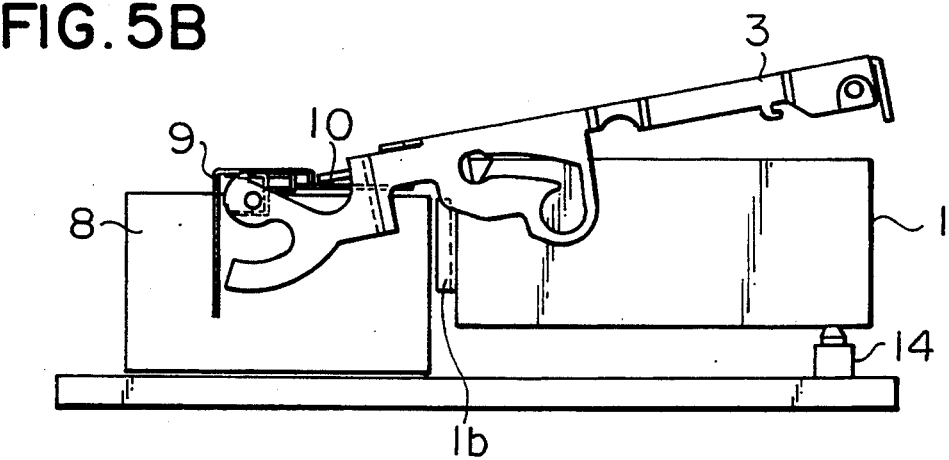
Figure 5C:
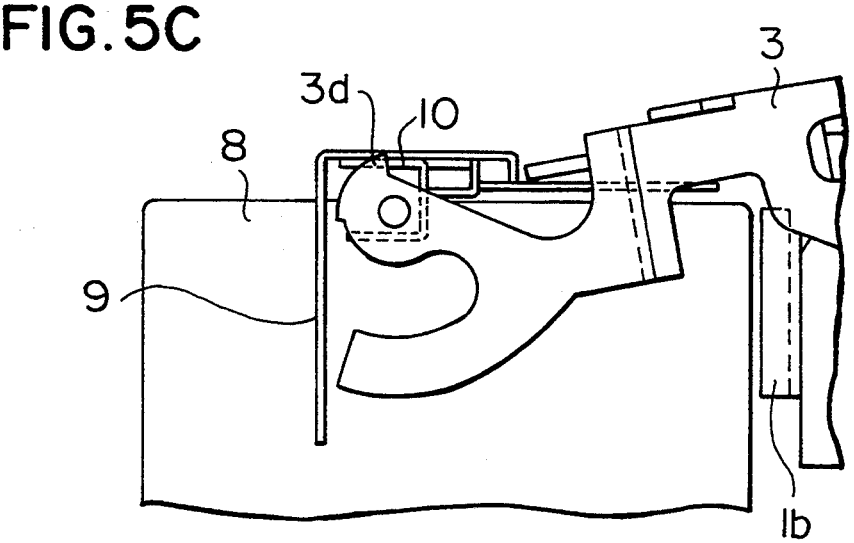
FIG. 5C is an enlarged side-elevational view showing the operation of the tape guide portion of the device.
Figure 6A:
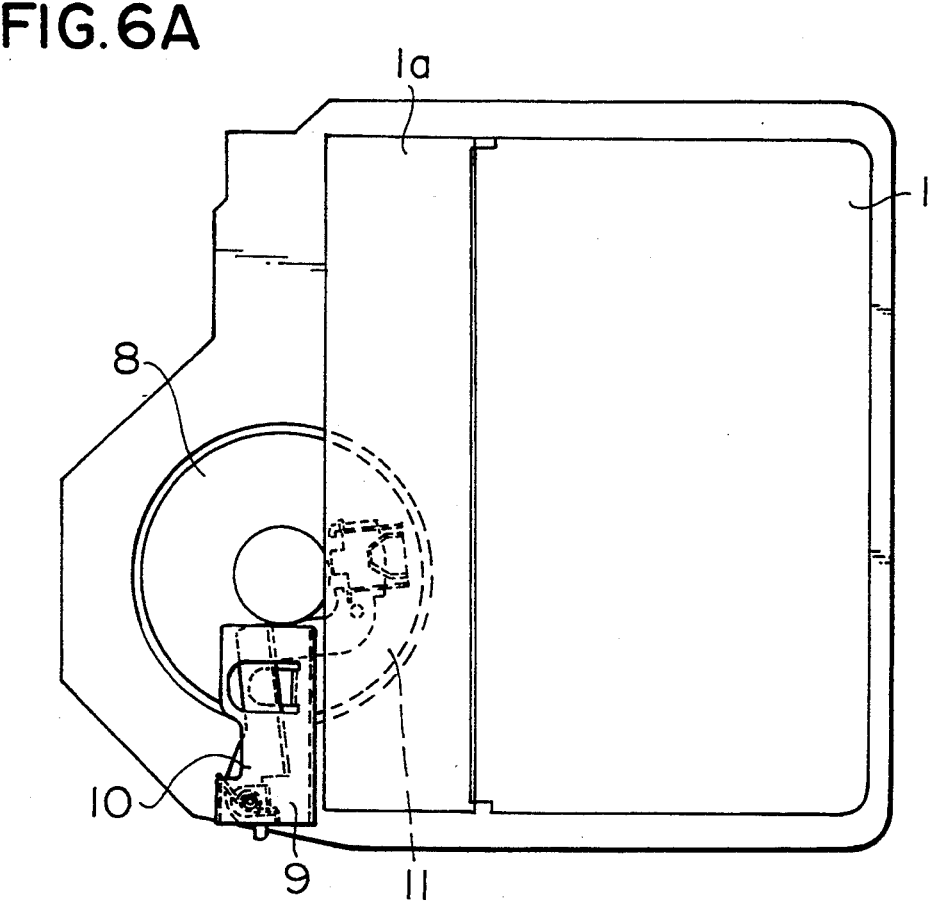
FIG. 6A is a top plan view showing the tape guide portion of the device.
Figure 6B:
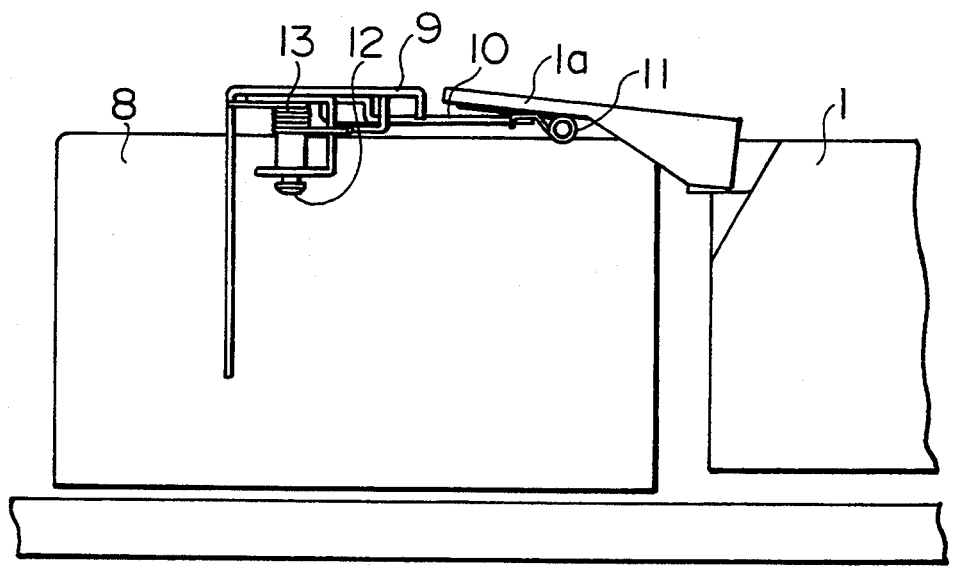
FIG. 6B is a side-elevational view showing the tape guide portion of the device.
Figure 7A:
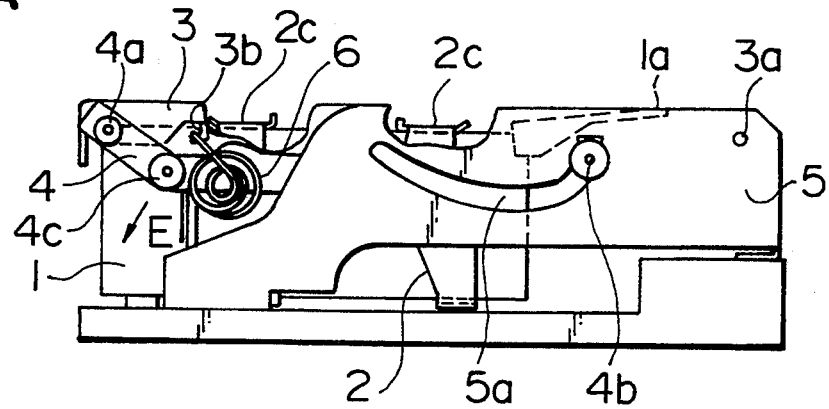
FIG. 7A is a side-elevational view of the device in a cassette-down position.
Figure 7B:
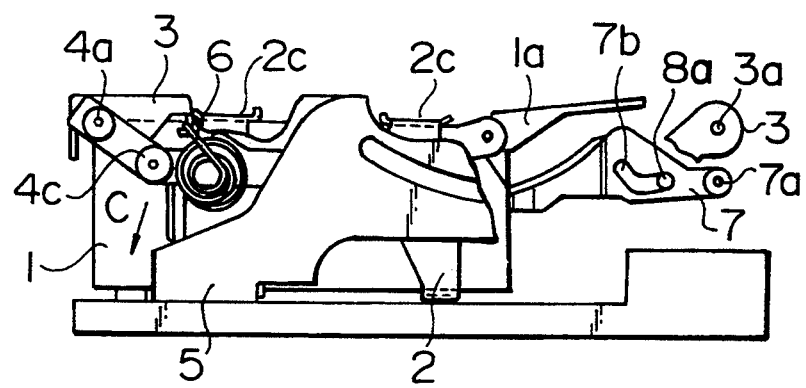
FIG. 7B is a fragmentary side-elevational view of the device in the cassette-down position.
Figure 7C:
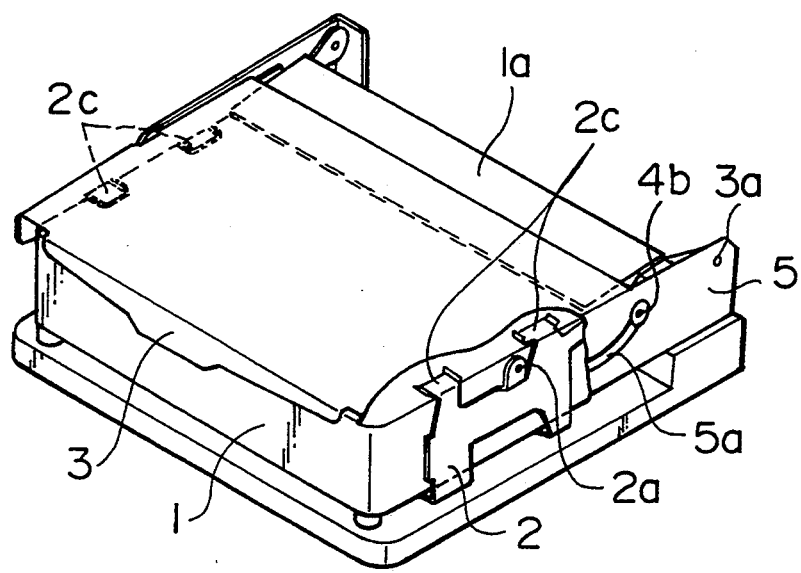
FIG. 7C is a perspective view of the device in the cassette-down position.

The operation of the above cassette loading device of this embodiment will now be described with reference to FIGS. 1A, 1B, 2A, 2B, 3A to 3C, 4A to 4C, 5A to 5C, 6A, 6B and 7A to 7C. First, when the cassette 1 is inserted into the cassette holders 2 in a direction of arrow A, the distal end of the opening lever 7 is disposed in such a position as to positively engage the lid 1a of the cassette 1, as shown in FIGS. 3A and 3C. Then, when the top plate 3 is manually pushed in a direction of arrow F, the top plate 3 is pivotally moved about the support portions 3a, and each arm 4 is pivotally moved about one end 4a while the other end 4b thereof slides along the slide groove 5a, so that each support portion 2a is moved in a direction of arrow B. At this time, since the other end 2b of each cassette holder 2 slides along the cam groove 3c of the top plate 3 in the direction of arrow B, the cassette holders 2 move parallel in the direction of arrow B. At this time, as shown in FIGS. 4A to 4C, the opening lever 7 is pivotally moved about the support portion 7a along the cam groove 7b in response to the angular movement of the pin 8a, and the distal end of the cassette lid 1a abuts against a surface 7c of the opening lever 7, and is pivotally moved to be opened along the surface 7c. At this time, the tape guide 11 is disposed at the position shown in FIGS. 2A and 2B until the lower edge of the magnetic tape 1b passes past the upper end of the cylinder 8 (see FIG. 5A), and the tape guide 11 prevents the magnetic tap 1b from running on the cylinder 8 when the magnetic tape 1b is slack, thereby preventing damage to the magnetic tape 1b. At this time, the cassette lid 1a abuts against the distal end of the tape guide 11, so that the tape guide 11 is deformed in a direction of arrow D; however, since the tape guide 11 is formed by a coil spring, it is returned to its initial condition because of its restoring force after the cassette lid 1a passes past it. Then, when the top plate 3 moves to the position shown in FIGS. 5B and 5C, an end surface 3d of the top plate 3 abuts against an end surface 10a of the second plate 10 (FIG. 2A), and the second plate 10 is pivotally moved about the pin 12 in a direction opposite to the direction of arrow C, and is brought into a position shown in FIGS. 6A and 6B. When the top plate 3 is further pivotally moved, the cassette 1 is transferred to a cassette-down position shown in FIGS. 7A to 7C, and is engaged with positioning pins 14 on the device body to be loaded at a predetermined position. In this position, the top plate 3 is locked at the predetermined position of the device body by a lock mechanism (not shown). In this position, each arm 4 is urged about the support portion 4a in a direction of arrow E by the up-spring 6, and this urging force is transmitted to the cassette holder 2 since the other end 4b of the arm 4 is not restrained by the slide groove 5a, thereby urging the cassette 1 in a direction to fix the same to the device body. At this time, the lid 1a of the cassette 1 is in a fully-opened condition. When the lock mechanism is released, the top plate 3 is urged to be pivotally moved by the biasing force of the up-springs 6 in a direction opposite to the direction of arrow F as shown in FIGS. 7A to 7C, and this movement causes the cassette holders 2 to move parallel in a direction opposite to the direction of arrow B via the arms 4, so that the cassette holders 2 are returned to the position of FIGS. 1A and 1B while the cassette can be loaded on and unloaded from the cassette holders 2. At this time, the lid 1a of the cassette 1 is moved in a manner reverse to the above cassette-down movement, and abuts against the distal end of the tape guide 11, so that the tape guide 11 is deformed in a direction opposite to the direction of arrow D; however, when the tape guide 11 becomes disengaged from the cassette lid 1a, the tape guide 11 is returned to the initial condition because of its spring force.

As described above, in this embodiment, while maintaining the precise positioning between the tape guide 11 and the cylinder 8, the tape guide 11 is moved in response to the pivotal movement of the top plate 3. With this arrangement, the extent to which the cassette lid 1a is opened during the cassette-down operation can be reduced, and therefore the cassette loading device of a thin construction can be provided. Further, since the tape guide 11 is formed by a coil spring, the tape guide 11 is highly resistant to a plastic deformation during the cassette-down operation.

Further, the pivotal point 7a of the opening lever 7 is provided at the stand 5, and the opening lever 7 is moved in response to the pivotal movement of the top plate 3. With this arrangement, the opening lever 7 can be provided outside of the cassette 1.

Further, the cassette holders 2 are moved in response to the pivotal movement of the top plate 3 via the arms 4, and therefore in the cassette-down position, the cassette holders 2 can be urged by the biasing force of the up-springs 6 in a direction to fix the cassette 1 to the device body, and operating switches and so on can be mounted at the plane of projection of the top plate 3.

Further, the up-springs 6 are of a spiral shape, and therefore the longitudinal dimension of the cassette holder can be reduced, and the device can be of a compact size.

A second embodiment of the present invention will now be described with reference to the drawings.

Figure 8:
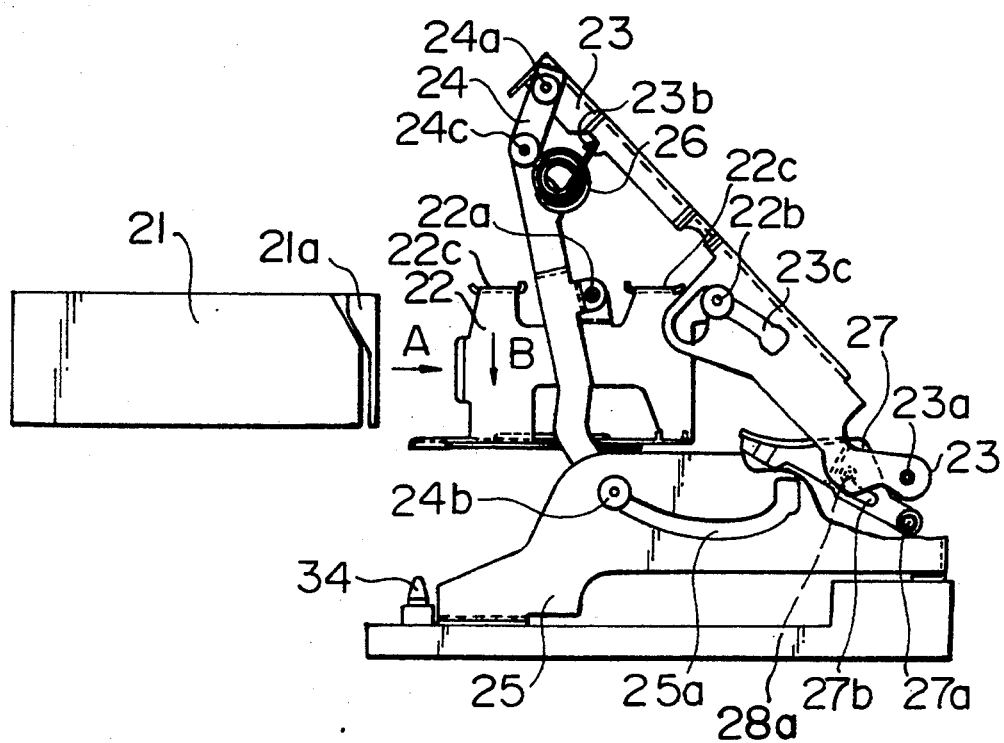
FIG. 8 is a fragmentary side-elevational view of a second embodiment of a cassette loading device of the present invention in a cassette loading/unloading position.
Figure 9A:
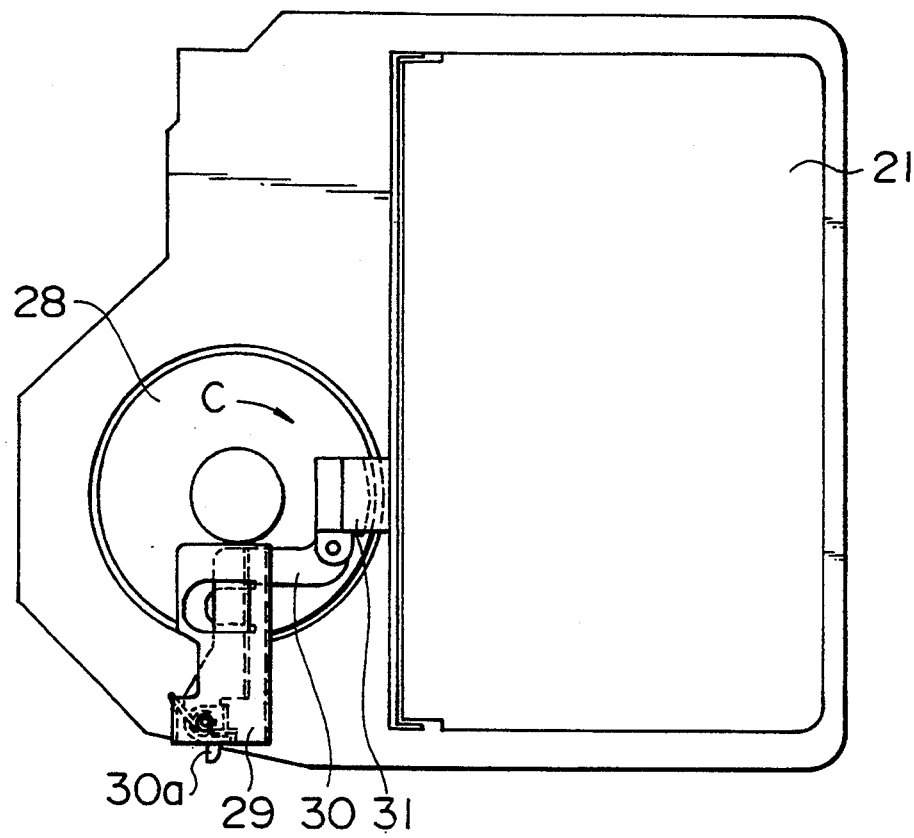
FIG. 9A is a top plan view showing a tape guide portion of the device of the second embodiment.
Figure 9B:
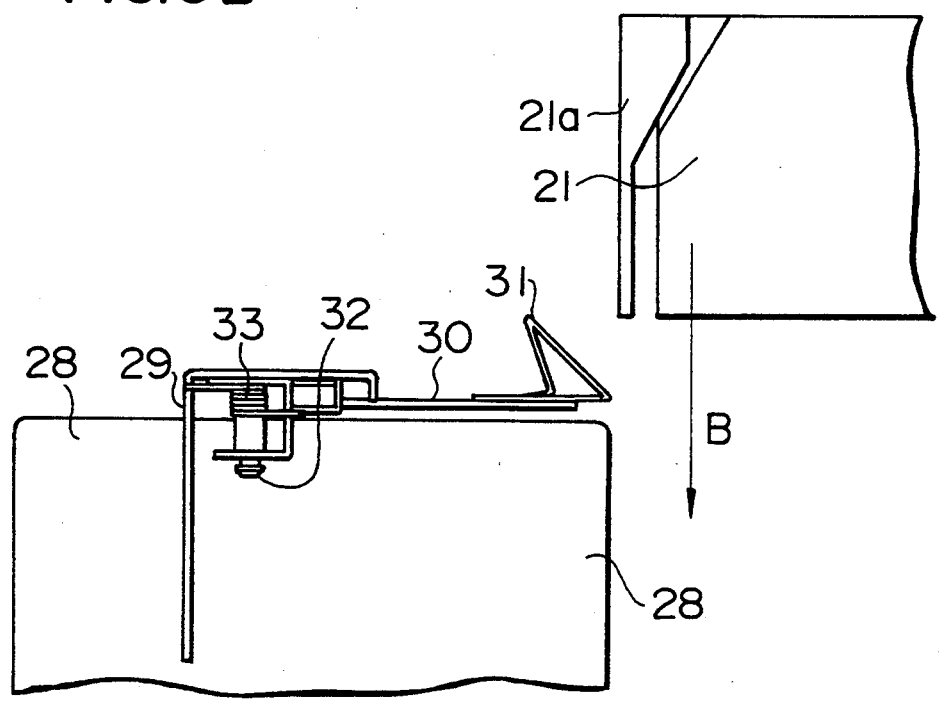
FIG. 9B is a side-elevational view showing the tape guide portion of the device of the second embodiment.

In FIGS. 8, 9A and 9B, the reference numeral 21 denotes a cassette; 21a a lid of the cassette 21; 21b a magnetic tape; 22 a pair of right and left cassette holders; 23 a top plate; 24 arms; 25 stands; 26 up-springs, and 27 a opening lever. Each cassette holder 22 is pivotally supported at its support portion 22a on the arm 24, and is slidably engaged at its support portion 22b in a cam groove 23c of the top plate 23. The top plate 23 is pivotally supported at its support portions 23a on the stands 25. The arm 24 is pivotally supported at its support portion 24a on the top plate 23, and is slidably engaged at its support portion 24b in a slide groove 25a of the stand 25. The up-spring 26 is engaged with an engagement portion 23b of the top plate 23, and is pivotally engaged with a support portion 24c of the arm 24. The opening lever 27 is pivotally supported at its support portion 27a on the stand 25, and a pin 28a formed on the top plate 23 is slidably engaged in a cam groove 27b of the opening lever 7. The reference numeral 28 denotes a cylinder; 29 a first plate fixedly secured to the stand 25 by screws; 30 a second plate pivotally supported by a pin 32 on the first plate 29; 31 a tape guide fixedly mounted on the second plate 30, and 33 a spring for urging the second plate 30 in a direction of arrow C.

Figure 10A:
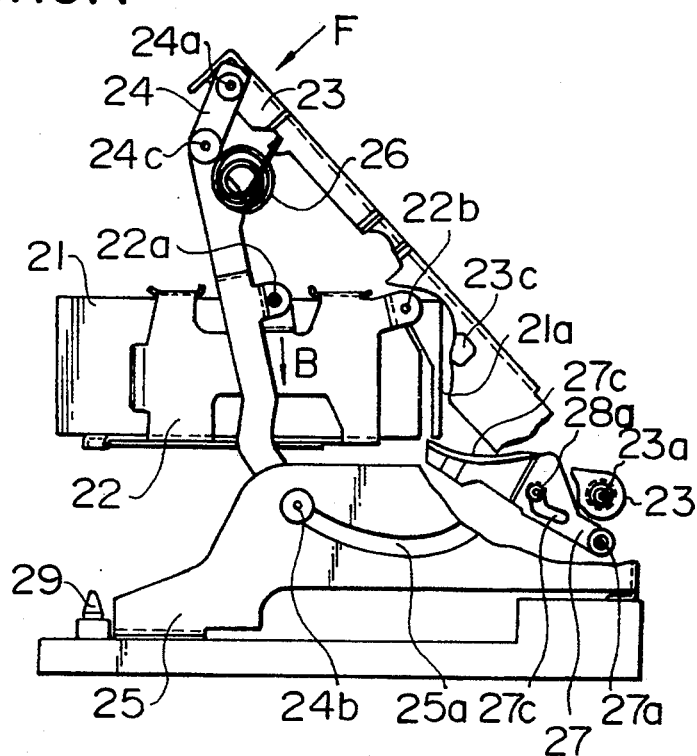
FIG. 10A is a side-elevational view of the device of the second embodiment in the cassette loading/unloading position.
Figure 10B:
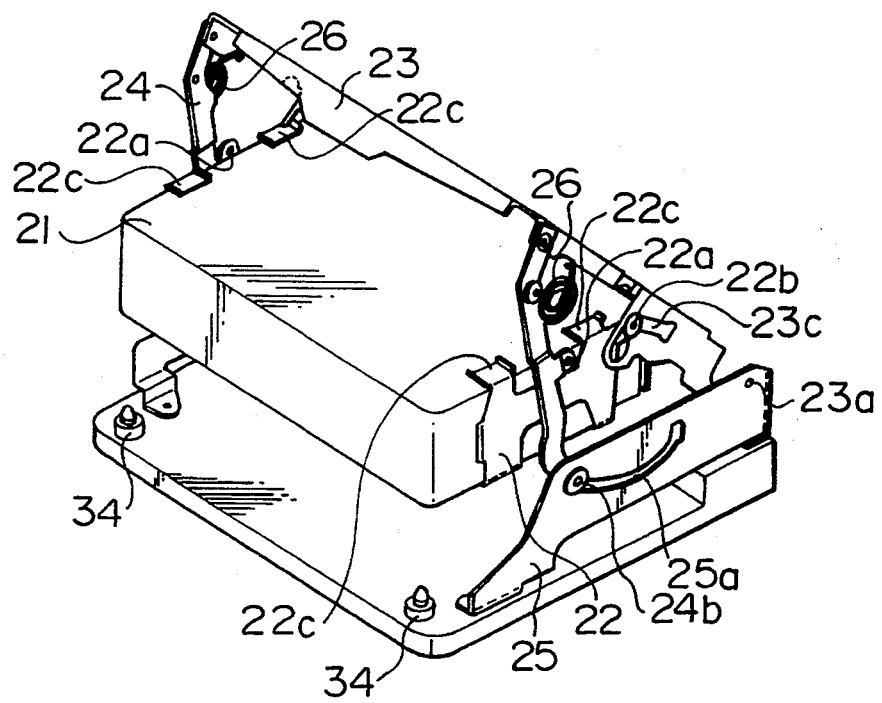
FIG. 10B is a perspective view of the device of the second embodiment in the cassette loading/unloading position.
Figure 11A:
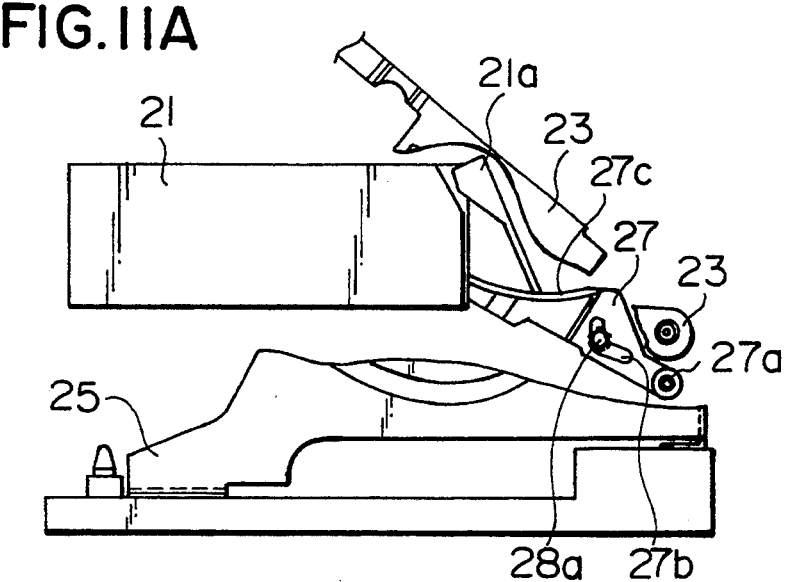
FIGS. 11A to 11C are fragmentary side-elevational views showing the operation of an opening lever portion of the device of the second embodiment.
Figure 11B:
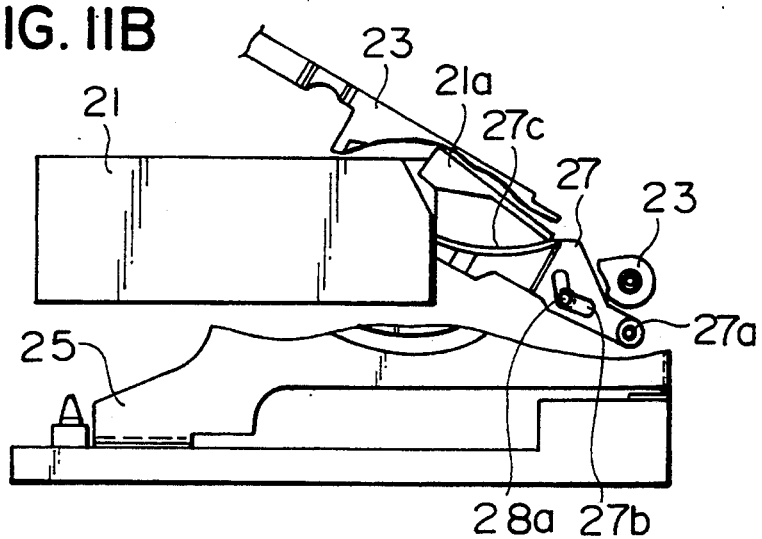
Figure 11C:
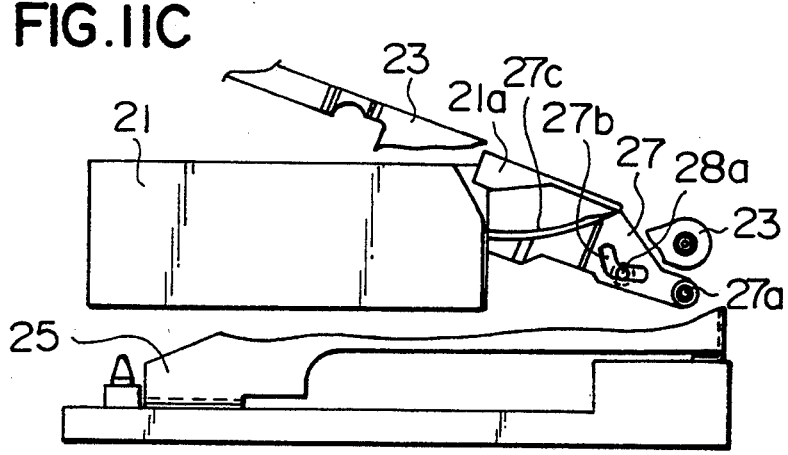
Figure 12A:
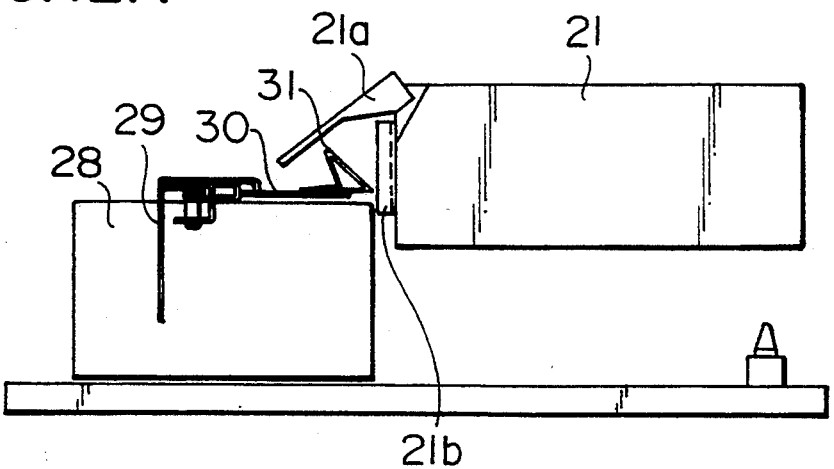
FIGS. 12A and 12B are side-elevational views showing the operation of the tape guide portion of the device of the second embodiment.
Figure 12B:
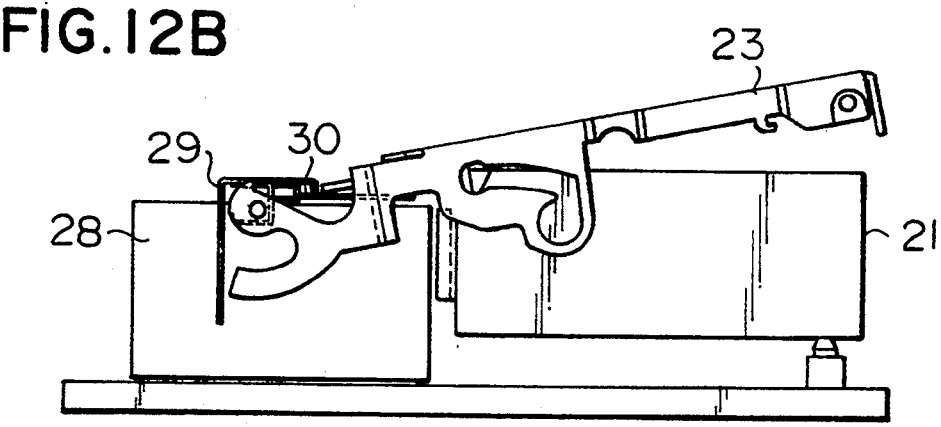
Figure 12C:
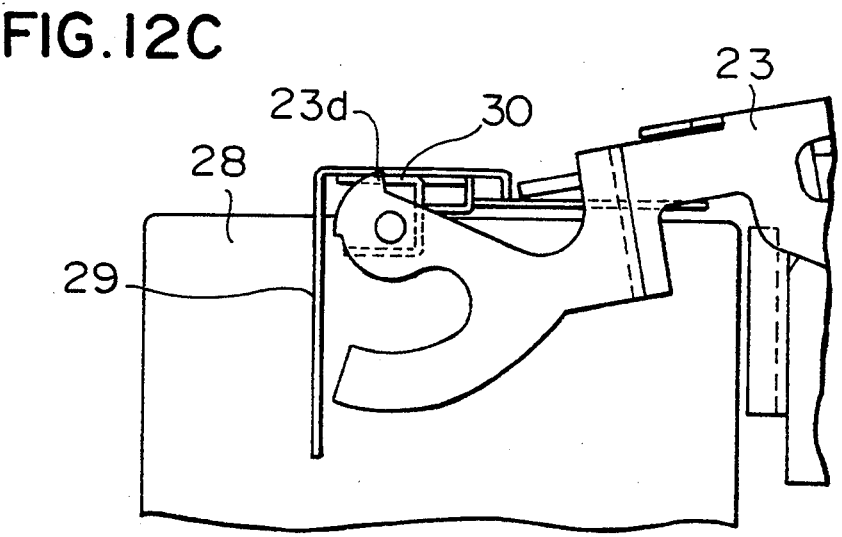
FIG. 12C is an enlarged side-elevational view of the tape guide portion of the device of the second embodiment.
Figure 13A:
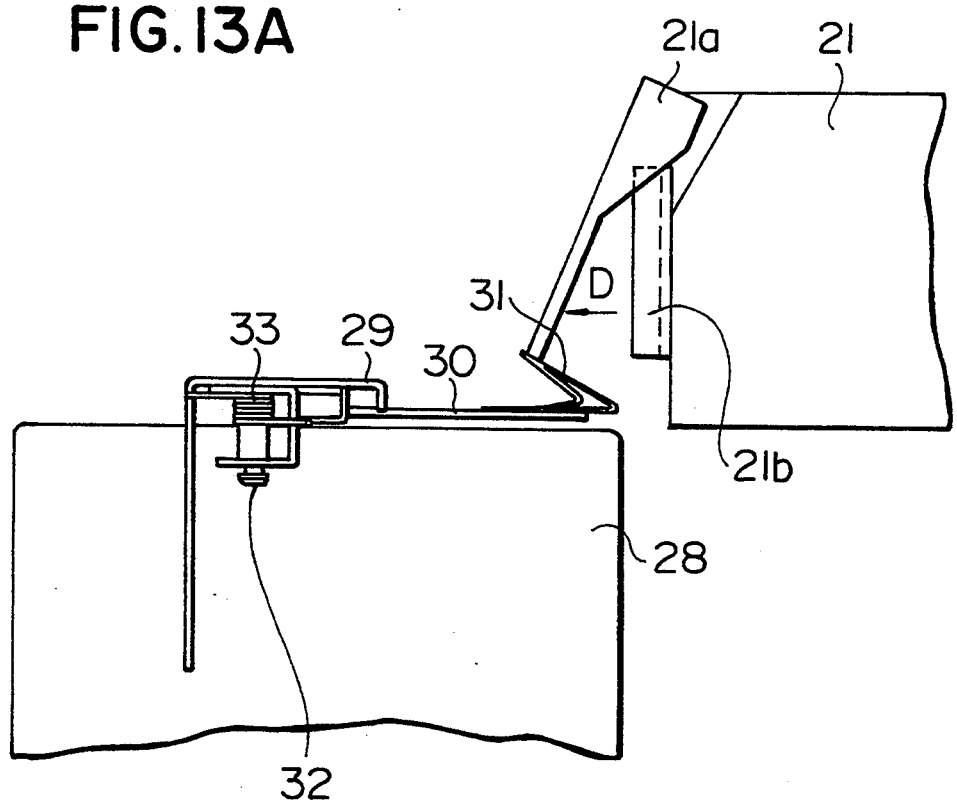
FIGS. 13A and 13B are side-elevational views showing the tape guide portion of the device of the second embodiment.
Figure 13B:
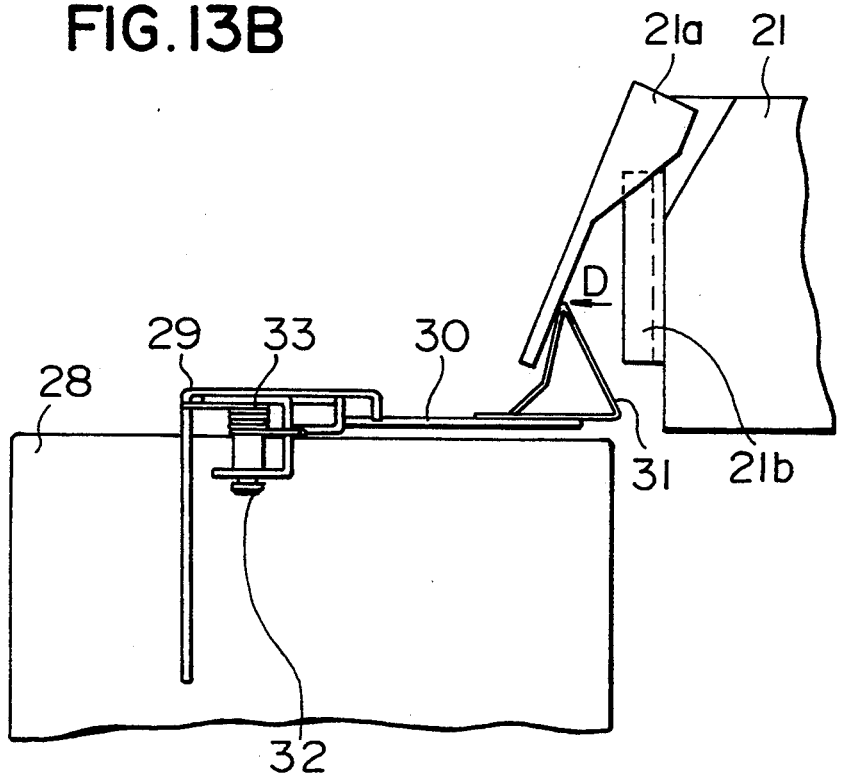
Figure 14A:
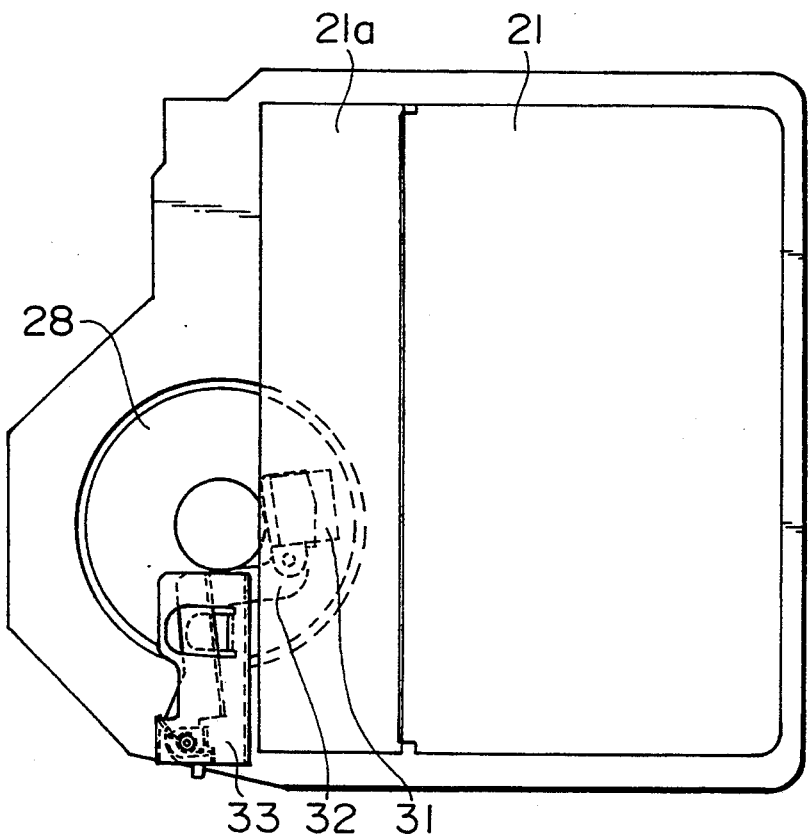
FIG. 14A is a top plan view of the device of the second embodiment in a cassette-down position.
Figure 14B:
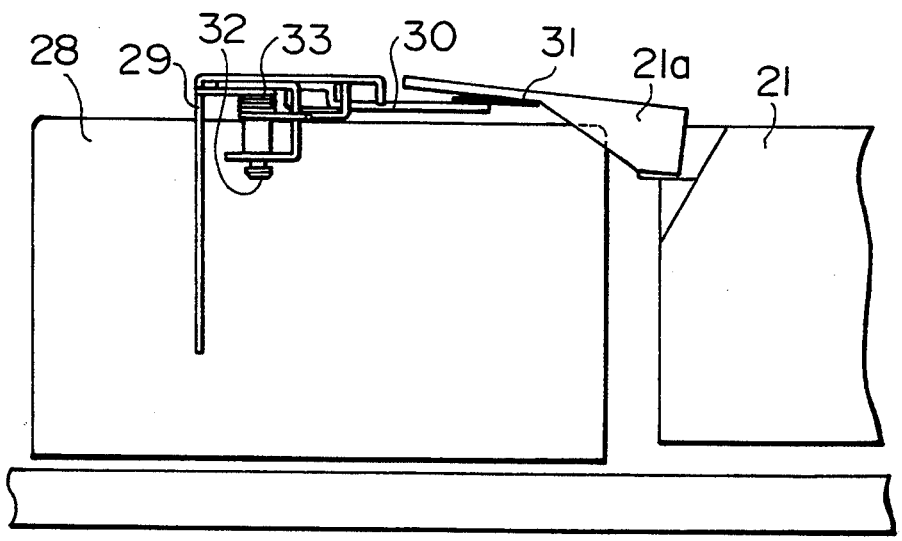
FIG. 14B is a side-elevational view of the device of the second embodiment in the cassette-down position.
Figure 15A:
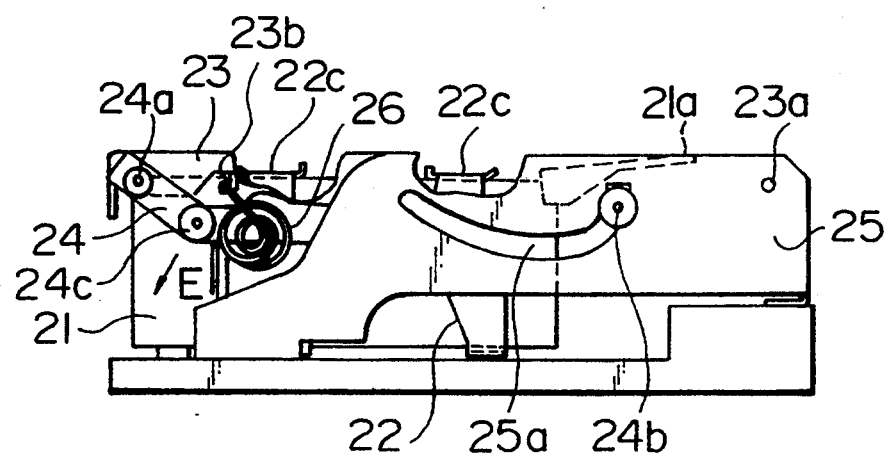
FIG. 15A is a side-elevational view of the device of the second embodiment in the cassette-down position.
Figure 15B:
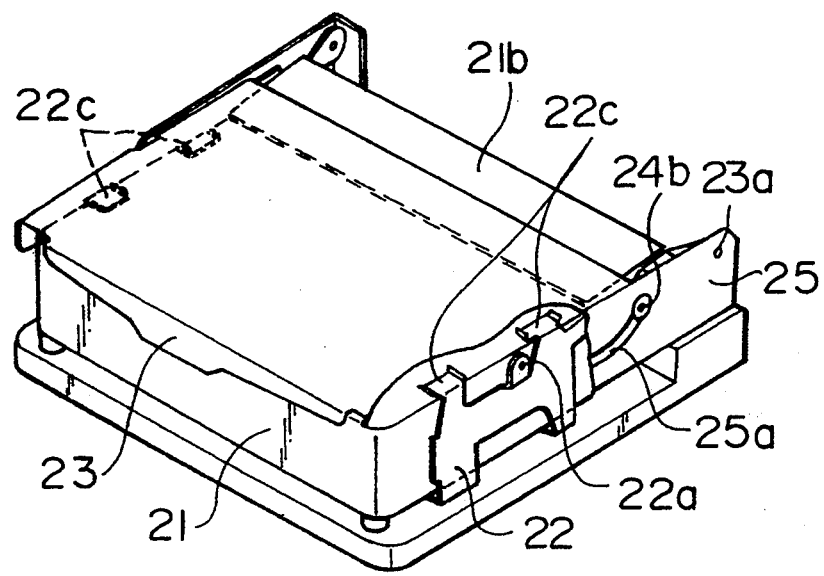
FIG. 15B is a perspective view of the device of the second embodiment in the cassette-down position.
Figure 16:
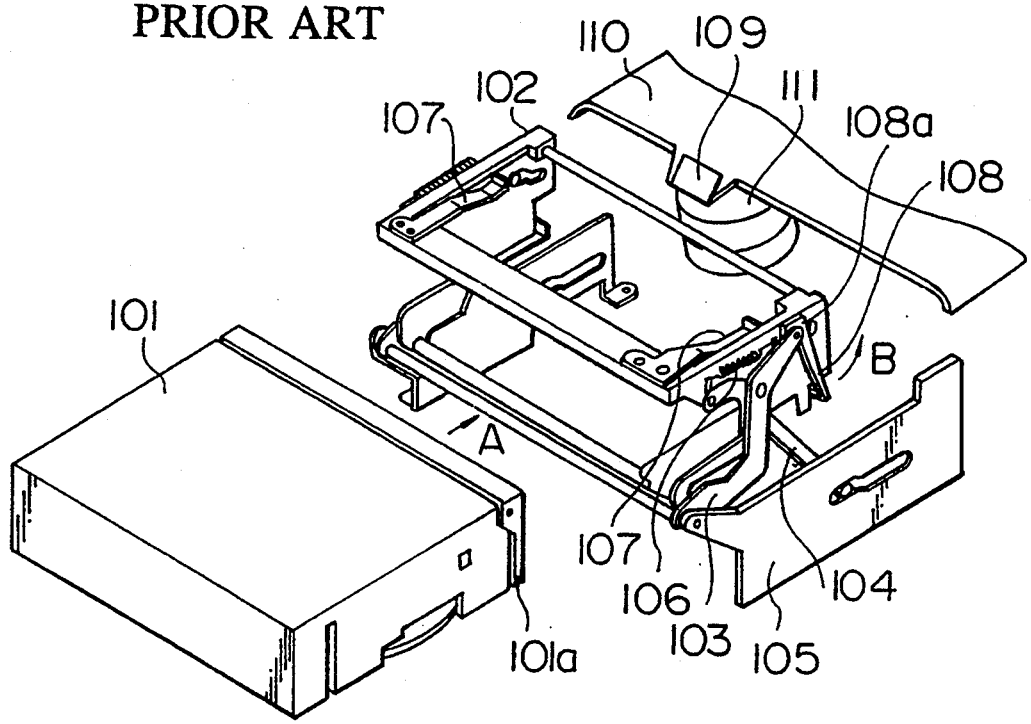
FIG. 16 is a perspective view of a conventional cassette loading device in a cassette loading/unloading position.
Figure 17:
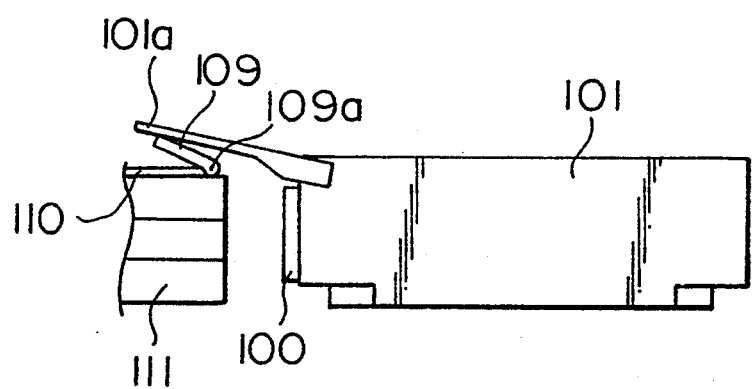
FIG. 17 is a side-elevational view showing a tape guide portion of the conventional device in a cassette-down position.
Figure 18:
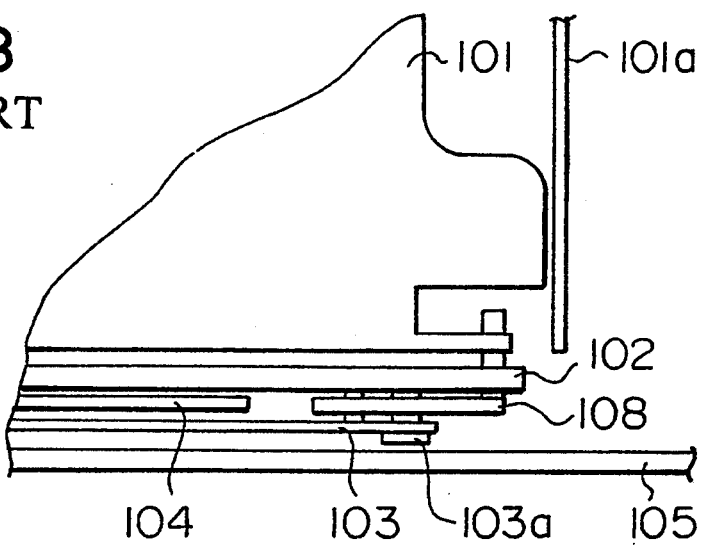
FIG. 18 is an enlarged cross-sectional view showing an opener portion of the conventional device.
Figure 19:
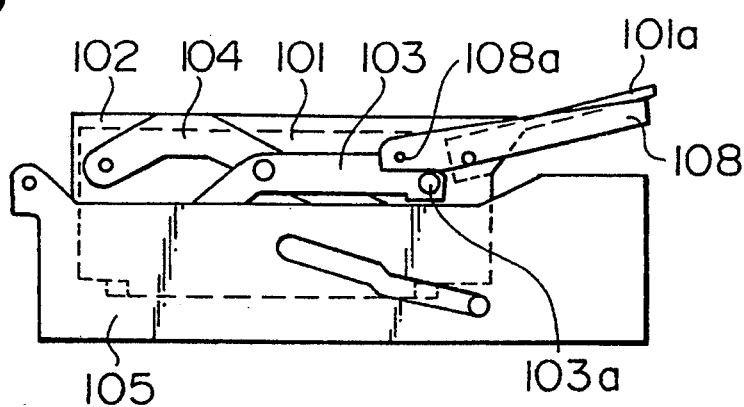
FIG. 19 is a side-elevational view of the conventional device in the cassette-down position.
Figure 20:
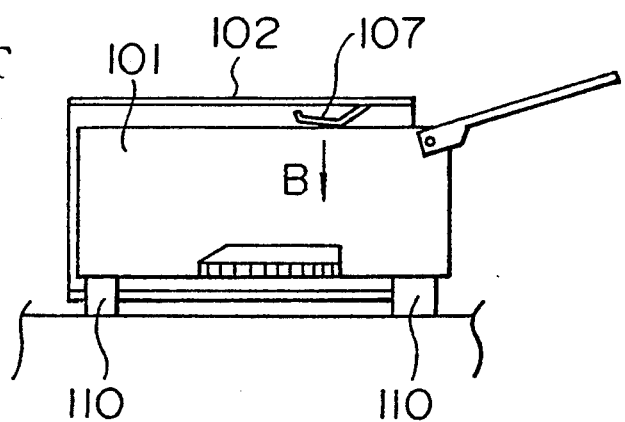
FIG. 20 is a cross-sectional view of the conventional device in the cassette-down position.

The operation of the above cassette loading device of this embodiment will now be described with reference to FIGS. 8, 9A, 9B, 10A, 10B, 11A to 11C, 12A to 12C, 13A, 13B, 14A and 14B. First, when the cassette 21 is inserted into the cassette holders 22 in a direction of arrow A, the distal end of the opening lever 27 is disposed in such a position as to positively engage with the lid 21a of the cassette 21, as shown in FIGS. 10A and 10B. Then, when the top plate 23 is manually pushed in a direction of arrow F, the top plate 23 is pivotally moved about the support portions 23a, and each arm 24 is pivotally moved about one end 24a while the other end 24b thereof slides along the slide groove 25a, so that each support portion 22a is moved in a direction of arrow B. At this time, since the other end 22b of each cassette holder 22 slides along the cam groove 23c of the top plate 23 in the direction of arrow B, the cassette holders 22 move parallel in the direction of arrow B. At this time, as shown in FIGS. 11A to 11C, the opening lever 27 is pivotally moved about the support portion 27a along the cam groove 27b in response to the angular movement of the pin 28a, and the distal end of the cassette lid 21a abuts against a surface 27c of the opening lever 27, and is pivotally moved or opened along the surface 27c. At this time, as shown in FIG. 13A, the distal end of the cassette lid 21a abuts against the tape guide 31, so that the tape guide 31 is deformed in a direction of arrow D; however, since the tape guide 31 is formed by a plate-like resilient member of a resin, it is returned to its initial condition because of its restoring force after the cassette lid 21a passes past it. At this time, the tape guide 31 is disposed in the position shown in FIGS. 9A and 9B until the lower edge of the magnetic tape 21b passes past the upper end of the cylinder 28 (see FIG. 12A), and the tape guide 31 prevents the magnetic tap 21b from running on the cylinder 28 when the magnetic tape 21b is slack, thereby preventing damage to the magnetic tape 21b. Then, when the top plate 23 moves to the position shown in FIGS. 12B and 12B, an end surface 23d of the top plate 23 abuts against an end surface 30a of the second plate 30 (FIG. 9A), and the second plate 30 is pivotally moved about the pin 32 in a direction opposite to the direction of arrow C, and is brought into a position shown in FIGS. 13A and 13B. When the top plate 23 is further pivotally moved, the cassette 21 is transferred to a cassette-down position shown in FIGS. 15A and 15B, and is engaged with positioning pins 34 on the device body to be loaded in a predetermined position. In this position, the top plate 23 is locked in a predetermined position of the device body by a lock mechanism (not shown). In this position, each arm 24 is urged about the support portion 24a in a direction of arrow E by the up-spring 26, and this urging force is transmitted to the cassette holder 22 since the other end 24b of the arm 24 is not restrained by the slide groove 25a, thereby urging the cassette 21 in a direction to fix the same to the device body. At this time, the lid 21a of the cassette 21 is in a fully-opened condition, as shown in FIGS. 14A and 14B. When the lock mechanism is released, the top plate 23 is urged to be pivotally moved under the bias of the up-springs 26 in a direction opposite to the direction of arrow F, and this movement causes the cassette holders 22 to be translated in a direction opposite to the direction of arrow B via the arms 24, so that the cassette holders 22 are returned to the position shown in FIG. 8 where the cassette can be loaded on and unloaded from the cassette holders 22. At this time, the cassette lid 21a is moved in a manner reverse to the above cassette-down movement, and abuts against the distal end of the tape guide 31, so that the tape guide 31 is deformed in a direction opposite to the direction of arrow D; however, when the tape guide 31 becomes disengaged from the cassette lid 21a, the tape guide 31 is returned to the initial condition because of its resiliency.

As described above, in this embodiment, while maintaining the precise positioning between the tape guide 31 and the cylinder 28, the tape guide 31 is moved in response to the pivotal movement of the top plate 23. With this arrangement, the extent, to which the cassette lid 21a is opened during the cassette-down operation can be reduced, and therefore the cassette loading device of a thin construction can be provided. Further, since the tape guide 31 is formed by a plate-like resilient member, the gap between the cylinder 28 and the cassette lid 21a during the cassette-down operation can be reduced.

As described above, in the present invention, the tape guide is designed to be movable, and is formed by a resilient member, and its unit is mounted on the stand. With this arrangement, the precise positioning between the cylinder and the tape guide is secured, and the mechanism for preventing the slackened magnetic tape from running on the cylinder to thereby prevent damage to the magnetic tape can be provided within a small space above the cylinder. Therefore, advantageously, there can be provided the cassette loading device of a thin, compact construction.

Further, the pivotal shaft of the opening lever is mounted on the stand, and the opening lever is engaged in the cam groove with the top plate. With this arrangement, the opening lever can be accommodated within the longitudinal dimension of the cassette, and the positive operation can be achieved with the simple construction. Therefore, there can be provided the cassette loading device which is reduced in size in the longitudinal direction of the cassette.

Further, the top plate is moved through the pivotal movement of the top plate and the arms. With this arrangement, operating switches and so on can be easily mounted on the plane of projection of the top plate, and the positional stability of the cassette loading device can be obtained, and the number of component parts can be reduced. Therefore, there can be provided the cassette loading device of a compact, lightweight construction.

Further, the cassette holders are moved in response to the pivotal movement of the top plate via the arms through the resilient force of the up-springs, and therefore in the cassette-down position, the cassette holders can be urged by the biasing force of the up-springs in a direction to fix the cassette to the device body. Therefore, separate members (e.g., push springs) heretofore needed for urging the cassette to fix the same to the device body are not required, and besides a shaft heretofore needed for aligning the right and left movements of the cassette holder with each other is not required. Therefore, the positional stability of the cassette loading device can be achieved, and the number of the component parts can be reduced, and there can be provided the cassette loading device which is of a compact, lightweight construction.

what is claimed is:

1. A cassette loading device comprising:
    a device body having a first cam groove;
    a cylinder mounted on said device body;
    a first member pivotally mounted on said device body and having a second cam groove;
    a second member having a first end which is pivotally mounted on said first member and a second end which is engaged in said first cam groove of said device body;
    a cassette holder for receiving a cassette having a magnetic tape contained therein, said cassette being provided with a lid, said cassette holder being pivotally connected to said second member and being engaged in said second cam groove of said first member so that a pivotal movement of said first member causes said cassette holder to move between a first position in which said cassette is loaded in or unloaded from said cassette holder and a second position in which signals are recorded on or reproduced from said magnetic tape;
    guide means for guiding said magnetic tape, said guide means comprising means for preventing said magnetic tape from running on top of said cylinder when said magnetic tape is slack;
    a pivotal member pivotally mounted on said device body and for engaging with said first member so that during a movement of said cassette holder from said first position to said second position, said pivotal member is engaged with said lid of said cassette to open said lid of said cassette and to cause said guide means to guide said magnetic tape; and
    moving means for moving said guide means in response to a movement of said second member to move said guide means away from said cassette when said cassette holder is disposed in said second position.

2. A cassette loading device according to claim 1, in which said guide means comprises:
   a third member pivotally mounted on the device body; and
   a guide member of a resilient material mounted on said third member so as to guide said magnetic tape.

3. A cassette loading device according to claim 2, in which said guide member comprises a coil spring.

4. A cassette loading device according to claim 2, in which said guide member comprises a plate-like resilient member.

5. A cassette loading device according to claim 1, in which said moving means comprises means for causing relative movement between said guide means and said cassette holder.

6. A cassette loading device according to claim 1, wherein:
   said pivotal member has a third cam groove; and
   said first member comprises a pin which is engaged in said third cam groove of said pivotal member.

7. A cassette loading device according to claim 1, wherein:
   said first member has a lower end at which said first member is pivotally mounted on said device body and un upper end remote from said lower end; and
   said first end of said second member is pivotally mounted on said upper end of said first member.

* * * * *